Aug. 21, 1962 G. P. MATHEWS ETAL 3,050,156
RIGHT ANGLE, LEVER-WEDGE ACTUATED MECHANICAL BRAKE
Filed Sept. 10, 1959 4 Sheets-Sheet 1
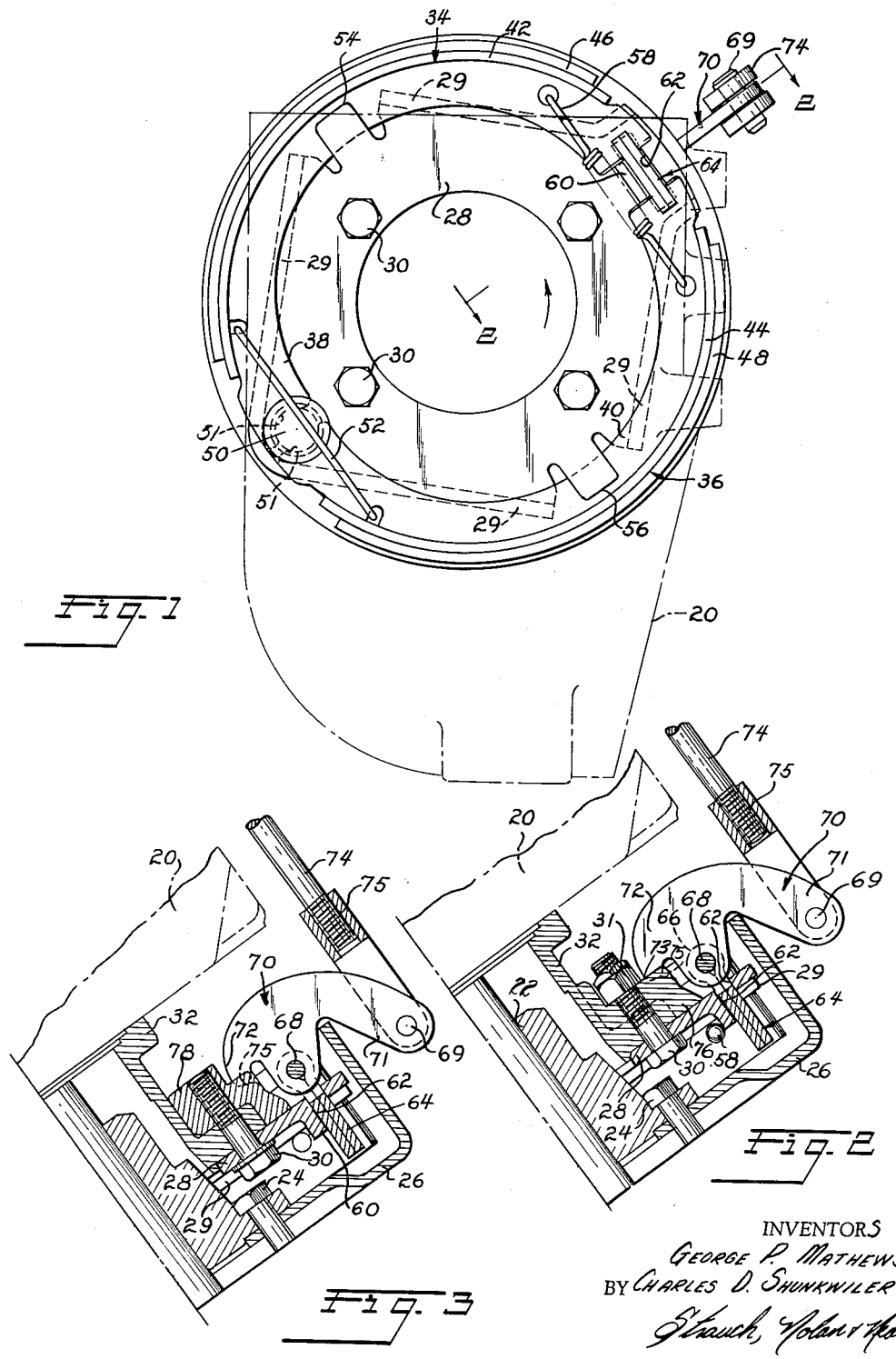
INVENTORS
GEORGE P. MATHEWS
BY CHARLES D. SHUNKWILER
Strauch, Nolan & Neale
ATTORNEYS Aug. 21, 1962  G. P. MATHEWS ETAL  3,050,156
RIGHT ANGLE, LEVER-WEDGE ACTUATED MECHANICAL BRAKE
Filed Sept. 10, 1959  4 Sheets-Sheet 2
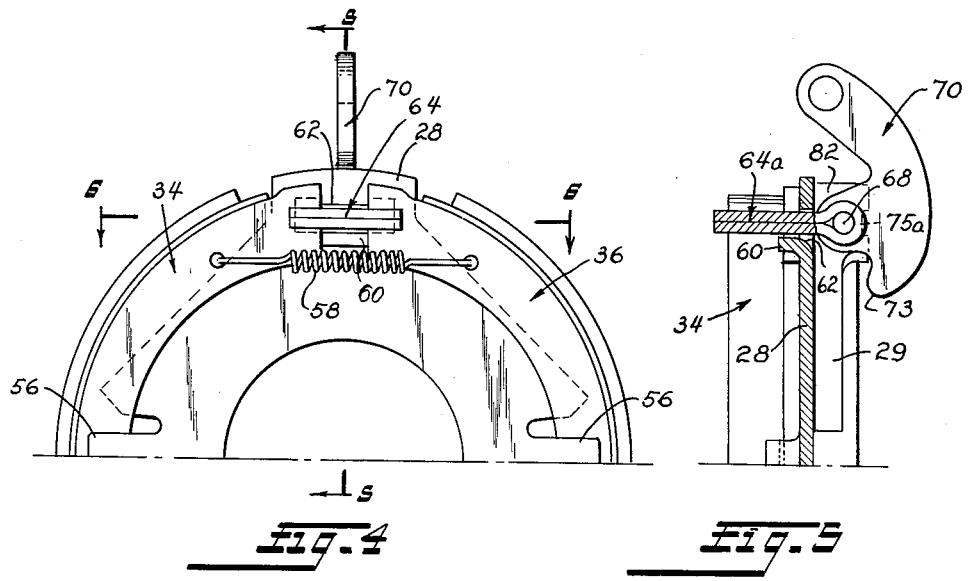
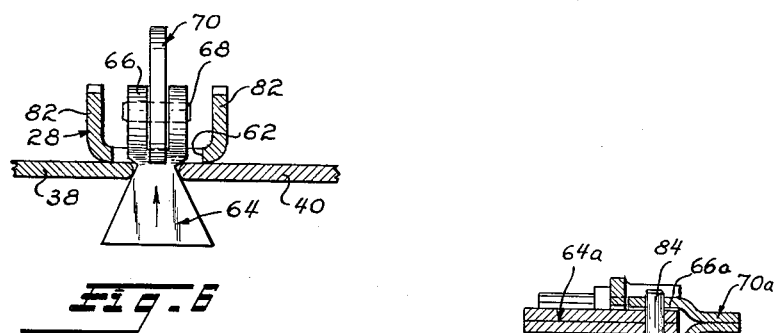
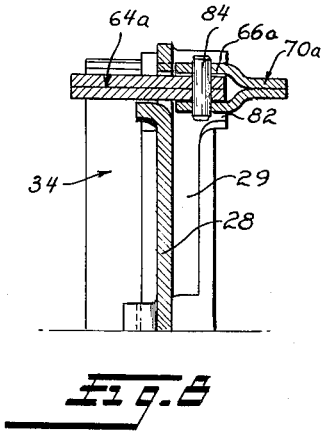
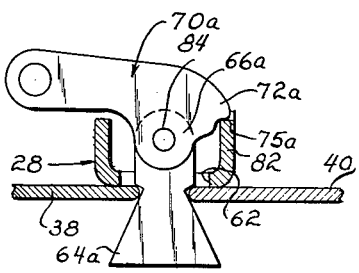
INVENTORS
GEORGE P. MATHEWS
BY CHARLES D. SHUNKWILER
Strauch, Nolan & Neale
ATTORNEYS

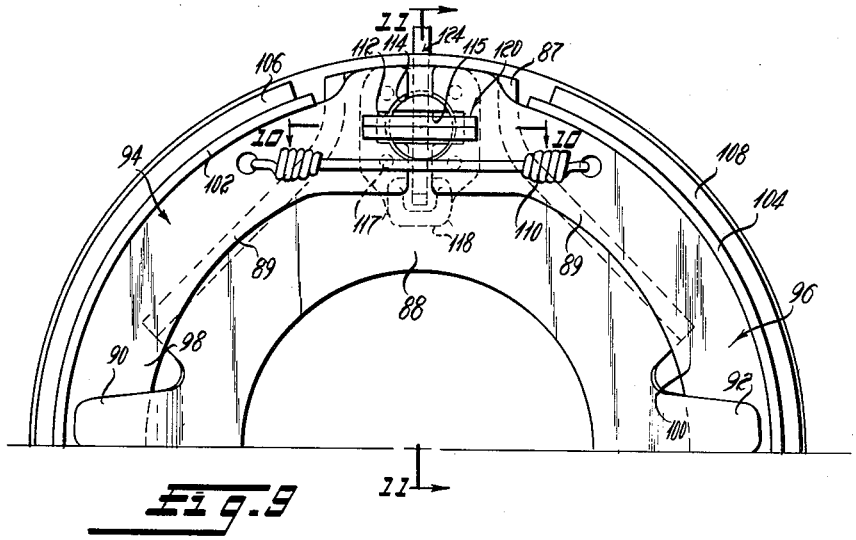
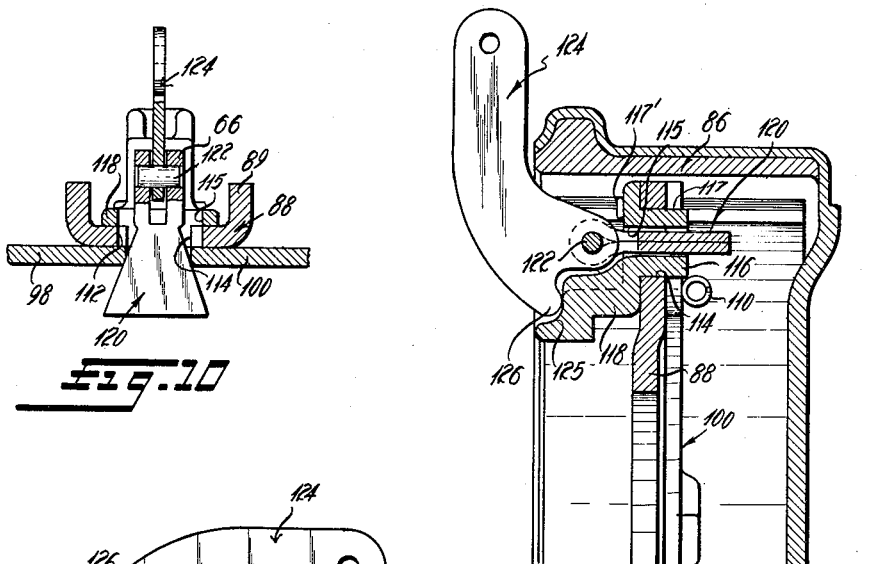
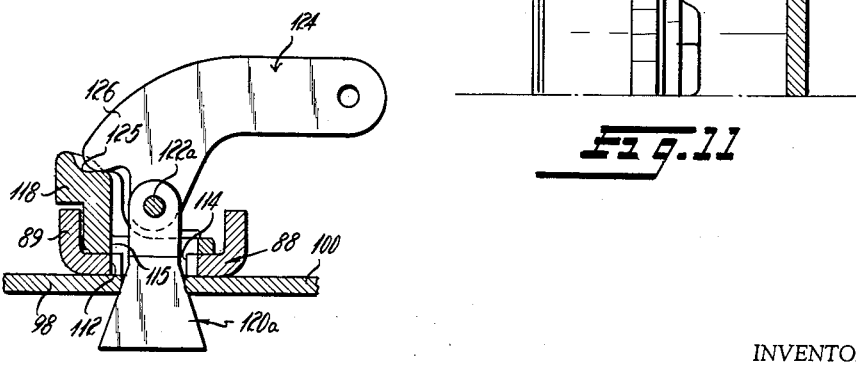

Aug. 21, 1962   G. P. MATHEWS ETAL   3,050,156
RIGHT ANGLE, LEVER-WEDGE ACTUATED MECHANICAL BRAKE
Filed Sept. 10, 1959   4 Sheets-Sheet 4
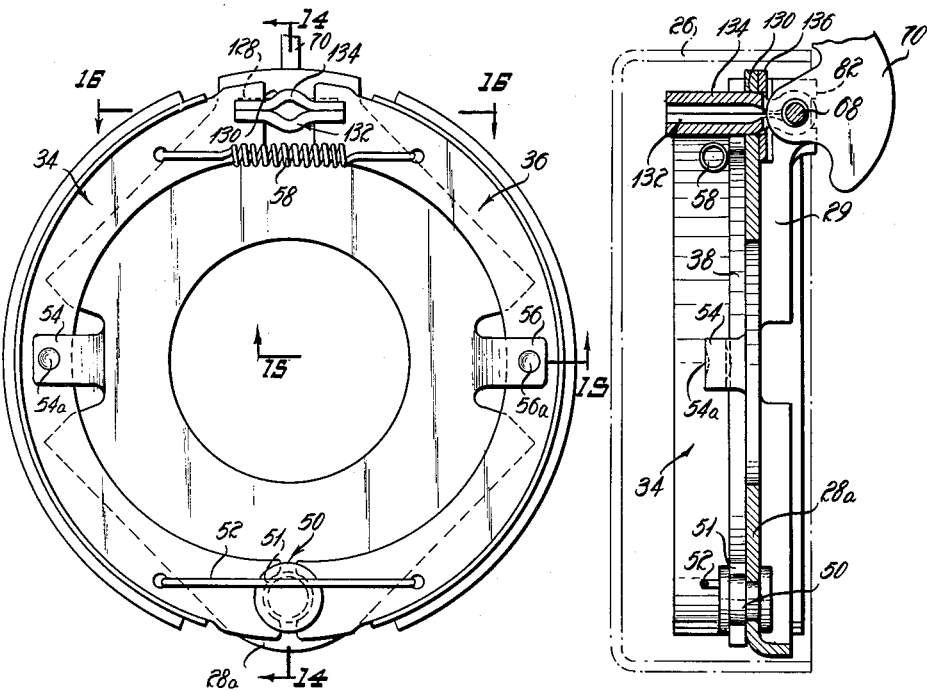
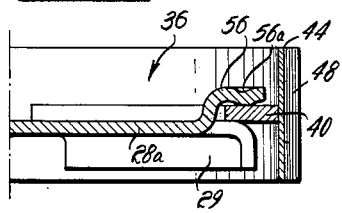
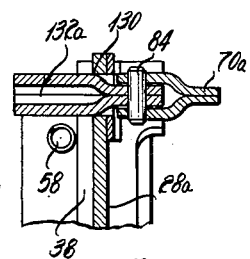
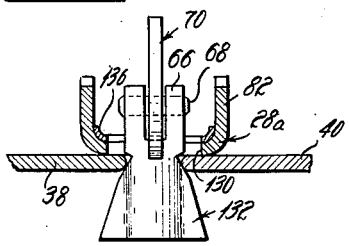
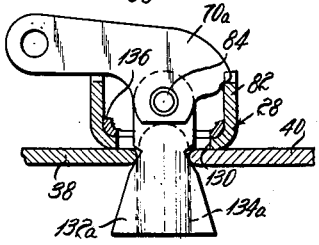
INVENTORS
GEORGE P. MATHEWS
CHARLES D. SHUNKWILER
BY
Strauch, Nolan & Neale
ATTORNEYS United States Patent Office 3,050,156
Patented Aug. 21, 1962

3,050,156
RIGHT ANGLE, LEVER-WEDGE ACTUATED MECHANICAL BRAKE
George P. Mathews, Ashtabula, Ohio, and Charles D. Shunkwiler, Linesville, Pa., assignors to Rockwell-Standard Corporation, Coraopolis, Pa., a corporation of Pennsylvania
Filed Sept. 10, 1959, Ser. No. 839,237
10 Claims. (Cl. 188—78)

The present invention relates to improvements in mechanical brake actuating mechanism and more specifically to wedge type brake actuators in association with a single brake lever.

In automotive vehicles the brake actuators recommended for maximum braking efficiency are usually powered by air, hydraulic fluid or electrically. Mechanical actuation of vehicle brakes is usually limited to such devices as parking brakes and/or transmission brakes, and the present invention is primarily concerned with the latter application, as on a propeller shaft.

Space limitations and location of such a brake require a small light yet highly efficient brake to effectively stop the rotation of the main propeller shaft. A variety of such brakes using different combinations of cam and lever arrangements have been proposed heretofore striving to provide leverage ratios of such proportions as to achieve a maximum brake output. Many of those devices have been proved too complicated, incorporating complex various cam, lever and linkage combinations that are not practical and are also too expensive to manufacture. Further, in many of these brakes certain parts are subjected to excessive wear and need frequent replacement.

The present invention has been proposed to overcome the above mentioned disadvantages of prior art devices by providing an improved mechanical brake actuating mechanism which provides maximum brake output by attaching a wedge type brake actuator to the pull or push rod linkage of a hand lever without the use of intermediate levers, bell cranks or secondary linkages.

The present invention provides a simple and inexpensive mechanical brake actuating mechanism which consists essentially of a fixed or floating wedge acting directly on the brake shoes with a camming action and capable of being incorporated in a servo or non-servo brake, the pulling or pushing actuating force being applied at a right angle to the plane of the brake, and furthermore being capable to be attached to hand brake levers having various different locations which may be disposed as much as 90° from each other.

Accordingly, a primary object of the present invention is the provision, in an internally expanding propeller or like shaft brake, of a simple but highly efficient novel actuation means which can be directly connected to a hand lever without the use of bell cranks or other force direction change linkage.

A further object of the present invention is to provide in an internally expanding brake a novel right angle camming device of simple construction that can be manufactured at low cost.

Another object of the present invention is the provision of novel brake shoe actuator means consisting of a lever and wedge combination capable of being matched in a variety of lever lengths and cam ratios so as to achieve maximum adaptability for the varying input-output requirements at minimum tooling costs.

Still another object of the present invention is to provide in a brake actuator mechanism a novel fixed or floating wedge capable of being used in an anchored or self-energizing "servo" brake.

Still a further object of the present invention is the provision of a lever and wedge brake actuating mechanism directly attached to a hand lever linkage having various locations, by providing a wedge capable of being assembled to brake levers positioned at varying angles up to 90° from each other.

Those and other objects and features of the present invention will become more evident by the following specification having reference to the accompanying drawings in which:

FIGURE 1 is a rear elevational view of a brake assembly in accordance with a preferred embodiment of the present invention attached to the rear of a transmission housing;

FIGURE 2 is a fragmentary section through the actuating mechanism of the brake of FIGURE 1 along line 2—2;

FIGURE 3 is a section like FIGURE 2 but showing a modification in this area;

FIGURE 4 illustrates in rear elevation another embodiment of a brake actuating mechanism of the present invention;

FIGURE 5 is a section along line 5—5 of FIGURE 4 showing the actuator;

FIGURE 6 is a transverse section on line 6—6 through the actuating mechanism of FIGURE 4;

FIGURE 7 illustrates an alternate lever attachment structure of the brake of FIGURE 4 in the area of FIGURE 6;

FIGURE 8 illustrates the FIGURE 7 structure viewed as in FIGURE 5;

FIGURE 9 is a rear view of another embodiment of a brake actuating mechanism of the present invention;

FIGURE 10 is a transvere section on line 10—10 through the actuating mechanism of the brake of FIGURE 9;

FIGURE 11 is a longitudinal section on line 11—11 through the brake of FIGURE 9;

FIGURE 12 is a the same section as FIGURE 10 except that the lever and reaction surface is rotated 90° therefrom;

FIGURE 13 shows in rear elevation a further embodiment of a brake assembly of the present invention;

FIGURE 14 is a longitudinal section on line 14—14 through the brake of FIGURE 13;

FIGURE 15 is a transverse section on line 15—15 through one-half of the brake of FIGURE 13 showing the brake shoe centering means;

FIGURE 16 is a transverse fragmentary section on line 16—16 through the brake actuating means of FIGURE 13; and FIGURES 17 and 18 are fragmentary sections showing the lever of the brake of FIGURE 13 in 90° apart positions.

The reference numerals refer to the same parts throughout the description.

Having reference to the FIGURES 1, 2 and 3 there is indicated in dot-dash lines a transmission housing 20 having a rotatable rear output propeller shaft attaching flange 22 (FIGURES 2 and 3) to which is secured as by bolts 24 a brake drum 26. Rotating brake drum 26 encloses a brake actuating mechanism comprising an annular backing or support plate 28. Plate 28 has along its edges re-enforcing ribs 29 that extend at right angles toward the drum 26. Plate 28 is attached as by bolts 30 to an extended tubular connection flange 32 (FIGURES 2 and 3) fixed on the rear of transmission housing 20. When nuts 31 are drawn tight the backing plate 28 comprises essentially a rigid extension of housing 20 enclosed by drum 26.

Backing plate 28 supports a forward brake shoe 34 and rearward brake shoe 36. Brake shoes 34 and 36 comprise webs 38 and 40 rigid with arcuate brake shoe platforms 42 and 44 respectively and friction linings 46 and 48 respectively on the platforms. Brake shoe webs 38 and 40 are pivotally anchored and positioned at adjacent ends upon an anchor pin 50 fixed on the lower end of backing plate 28. Preferably the shoe web ends have semi-circular recesses 51 journalled on the cylindrical pin 50. A single spring clip 52 secured to both brake shoes 34 and 36 extends across anchor pin 50 to retain both brake shoes bearing against the anchor pin.

Backing plate 28 is provided on the transverse center of the brake with lanced integral fingers 54 and 56 respectively which are bent out of the plane of plate 28 and then parallel thereto to extend over the flat outer sides of brake shoe webs 38 and 40 as in FIGURE 15 to retain the brake shoes in alignment against backing plate 28 and to center the shoes with respect to the brake drum.

At the actuation end of the brake shoes which is diametrically opposite pin 50 a powerful return spring 58 tends to retract the brake shoes from engagement with the brake drum, and the brake shoe webs 38 and 40 in the retracted position abut an integral tab 60 bent out of backing plate 28. Tab 60 and anchor pin 50 effectively locate and center the brake shoes.

Adjacent tab 60 backing plate 28 is provided with an elongated slot 62 through which extends inwardly a wedge type actuator 64 of slightly smaller dimensions than slot 62 to enable the wedge to compensatively float therein during brake application.

Wedge 64 is preferably made of a one piece flat sheet metal stamping which is bent upon itself to provide an eyelet and shackle end 66 to which is pivotally attached as by a pin 68 to a short suitably curved actuation lever 70 of such shape and dimensions as to clear the transmission housing and the edge of the drum 26. The longer arm 71 of lever 70 is pivoted at 69 to a conventional pull-rod linkage 74, which may be adjustable in length as by the telescoping screw connection 75 to compensate for brake lining wear. Linkage 74 connects to a usual hand brake lever (not shown) in the driver compartment of the vehicle.

The other relatively shorter arm 72 of lever 70 has a laterally projecting rounded end nose 73 bearing on a flange surface 75 to provide a fulcrum point for the lever 70. The reaction forces of the lever 70 can be taken on any suitable separate or integral reaction surfaces, which design and location depends largely on the type of application or transmission housing design and does not in itself constitute an inherent part of the present invention, and the embodiments shown in the drawings and described herein are therefore to be considered as suggestive only and not restrictive.

In FIGURE 2 reaction surface 75 is formed on a flange 76 which is an integral part of the brake attaching flange 32 of the transmission housing 20. In FIGURE 3 surface 75 is on a separate annular part 78 secured to flange 32 as by the bolt 30 that also secured backing plate 28 to flange 32. Wedge member 64 is flat and its shape is shown in FIGURE 6. The shackle end 66 is bifurcated to embrace arm 72 of lever 70 and the inclined side edges of wedge 64 are engaged by the shoe web ends under the pull of return spring 58.

In operation a pull is exerted on linkage 74 by the operator of the vehicle in order to apply the brakes. The lever 70 is thereby rocked about its fulcrum at surface 75 and pulls the wedge member 64 outwardly in the direction of the arrow in FIGURE 6. This oppositely rocks the brake shoes 34 and 36 about pivot 50 and into friction lining contact with the brake drum 26 to stop the rotation of the drum and propeller shaft. Assuming drum rotation in the direction of the arrow in FIGURE 1 forward shoe 34 "moves into" the drum while the reverse or rearward shoe 36 will be anchored against the integral tab 60 and anchor pin 50 and support the drum. In this anchored end embodiment of the invention the action of the floating wedge 64 applies essentially all of its stroke to the forward shoe 34 including the circumferentially acting force of the rearward shoe 36 until the latter abuts tab 60 because of the floating ability of the wedge which follows the forward shoe. This floating ability is such as to enable the wedge sufficient travel to use all of the forward shoe brake lining regardless of wear so that the wedge is always effective. The brake shoes are held in centered alignment with the backing plate 28 during actuation by means of the lanced fingers 54 and 56 and spring clip 52 on the anchor end.

The mechanical advantage of the input parts can be varied to satisfy various requirements and is dependent on the leverage ratio and the wedge angle. It has been found for example that wedge angles from 15° to 60° (included angle) are in most cases sufficient and practical.

When the pulling force on the lever 70 is released, wedge 64 is speedily and positively returned to initial position by the direct linkage, and brake shoes 34 and 36 are returned to retracted position by return spring 58. In case the linings on the brake shoes have worn, the shoes will be located in retracted condition directly by the wedge instead of by the tab 60 and will be centered by the drum 26 providing running clearance which will be maintained by friction imparted by the lanced fingers 54 and 56.

FIGURES 4 to 8 show an embodiment substantially the same as FIGURES 1 to 3 and the same parts are designated by the same numerals. Some parts such as the transmission housing, linkage and brake drum have been omitted in FIGURES 4 to 8 for clarity and simplicity but their functions are obvious from the foregoing which applies to all other embodiments.

The brake of FIGURES 4 to 8 is also of the anchored type having a floating wedge but differs from FIGURES 1 to 3 in that the backing plate 28 at the input end of the brake provides a yoke-like bracket 82 which is an extension of the re-enforcing ribs 29 at that point, and this bracket straddles wedge 64 as shown in FIGURE 6. FIGURES 7 and 8 show the actuation member connected at a right angle to the vertical centerline of the brake, as distinguished from FIGURES 4 to 6 where the actuation is on the centerline, and the bracket 82 serves as a reaction surface for a slightly different actuation lever 70a which has a shorter arm 72a fulcrumed on a bearing surface 75a on one of the upstanding flanges of bracket 82 as shown in FIGURE 7. The wedge member 64a of FIGURES 7 and 8 is a flat member embraced by bifurcated arms 66a of the actuation lever 70a, and a pin 84 pivotally connects the lever 70a. Operation of this brake essentially is the same as described for the brake of FIGURES 1 to 3. When the actuation lever is disposed as in FIGURES 4 and 5 it fulcrums on a stationary surface 75 as in FIGURES 1 to 3. When the actuation lever, as space considerations may demand, is in the 90° displaced condition of FIGURES 6 to 8 it fulcrums directly on the backing plate at 82.

FIGURES 9 to 12 show another and slightly different embodiment of a brake actuating mechanism according to the present invention and in this instance incorporated in a self-energizing or "servo" type brake. In servo type brakes it is necessary that the actuator be floating to permit the primary and secondary shoes to reach a single abutment, and to assure full energization of both shoes. For this purpose both shoes are usually positioned at their input ends whereas the opposite ends engage a common floating abutment which is usually adjustable to take up lining wear; all as well known to anyone skilled in the art and therefore not shown in the drawings. A spring keeps the lower ends of the brake shoes in contact with their common abutment enabling the primary shoe to transfer braking forces to the secondary shoe.

FIGURES 9 to 12 show the actuation or input end of a "servo" type brake consisting of a brake drum 86 which contains a brake assembly composed of a backing plate 88 provided at the transverse centerline of the brake with two integral formed lanced fingers 90 and 92 which hold the brake shoes 94 and 96 against and in alignment with backing plate 88. Brake shoes 94 and 96 are composed of webs 98 and 100 rigid with arcuate platforms 102 and 104 to which are secured brake shoe linings 106 and 108, respectively. A return spring 110, connecting the input ends of the brake shoes, tends to retract the shoes from the brake drum. During actuation brake shoes 94 and 96 are spread apart by a wedge type actuator which is able to float in its support. For this purpose backing plate 88 is provided intermediate the yoke like extension 87 of its reinforcing flange 89 with a transverse slot 112 having a cylindrical portion 114 intermediate its ends. Extending through the cylindrical portion 114 is a rotatably adjustable hub section 116 of a lever abutment flange 118. A reciprocable wedge member 120 freely extends through a diametral slot 115 in hub 116 of abutment flange 118. The projecting surface 117 of cylindrical hub section 116 serves as anchor and positioning means for the arcuately recessed adjacent web ends of both brake shoes 94 and 96, and as a fixed abutment point for the secondary shoe during brake actuation.

Wedge member 120 is of a similar construction as the wedge members of the other embodiments and is pivotally connected by pin 122 to an actuation lever 124 the longer arm of which is pivotally attached to a suitable actuation linkage. The shorter nosed down arm 126 of lever 124 provides a fulcrum point around which the lever rotates during actuation. The reaction force at the fulcrum point 126 bears on surface 125 of abutment flange 118 which may be secured to backing plate 88 in any convenient manner. Rivets 117' secure flange 118 to plate 88.

FIGURES 9, 10, 11 illustrate the actuation of the brake as being taken on the centerline like in FIGURES 1 to 5, but it is also possible to attach the lever 124 to wedge member 120 at a right angle to the centerline of the brake if application conditions demand, as illustrated in FIGURE 12. In this instance, the wedge 120a is completely flat as in FIGURE 8 and has at its attaching end a pin 122a to pivotally connect lever 124. Here the abutment flange 118, which serves both as reaction surface for lever 124 and anchor for both brake shoes, is rotated to the left or right to dispose surface 125 to suit the position of lever 124. Thus flange 118 may be rotated to essentially any desired position about the axis of hub 114 to suit the desired orientation for connection to the actuation lever, and there secured to plate 88 as by fasteners 117.

In operation when a pull is exerted on lever 124, the fulcrum point 126 of the lever rocks on its reaction surface on abutment flange 118 to pull wedge 120 outwardly to the left in FIGURE 11 to spread the brake shoes 94 and 96 into drum engagement. Almost all of the stroke of wedge 120 is applied to the primary shoe—which can be either one of the brake shoes 96 or 98 depending on the direction of the drum rotation by the ability of the wedge to follow this shoe. The primary shoe transmits brake forces to the secondary shoe (not shown) by means of their common floating abutment at the opposite brake shoe ends carrying the secondary shoe against the hub sections 116 of abutment flange 118. Upon release of the pulling force the brake shoes will be returned to their original position by means of the return spring 110.

The foregoing embodiments of FIGURES 1 to 12 illustrate the application of a floating wedge actuator in a brake mechanism according to the present invention.

FIGURES 13 to 18 show the application of a non-floating wedge incorporated in a brake similar to FIGURES 1 and 4 and like parts are therefore designated by like numerals. FIGURE 15 illustrates more clearly the construction and application of the integral lanced fingers 54 and 56 respectively, which align the brake shoes against the backing plate 28. Fingers 54 and 56 are provided with semispherical indentations 54a and 56a to reduce the area of friction contact surface on the brake shoe webs.

The non-floating wedge application requires a slightly altered backing plate 28a which differs insofar that no brake shoe abutment tab 60 on the input end is required. Backing plate 28a is provided with a slot 128 which converges intermediate its ends into a round hole 130. Slot 128 receives a reciprocable wedge member 132 which is of general similar appearance as wedge member 64 with the exception that its intermediate section has been bulged out longitudinally to provide a cylindrical shaft-like section 134 which matches the hole 130 in slot 128 to slidably guide the wedge 132 during application. An additional rigid support flange 136 with a matching slot and hole is provided in back of the backing plate 28a to increase the effective length of the wedge guideway.

FIGURES 17 and 18 illustrate the lever attached to the wedge member at right angles to the brake centerline and is similarly oriented to FIGURES 4 to 8.

The incorporation of a non-floating wedge provides an equal application of the wedge stroke forces to both shoes with the result that less unbalance of friction forces against the brake drum occurs and consequently an equal lining wear of both shoes is assured.

In any of the three combinations—floating wedge with fixed anchor, floating wedge with servo, or non-floating wedge with fixed anchor—the essential characteristic and features of the present invention are employed and a general similar brake performance will result.

Thus there has been provided in the invention a simple but sturdy and highly efficient mechanical brake actuating mechanism capable of being incorporated in different orientations where space requirements demand and capable of being attached to brake actuating linkages at various positions which may vary as much as 90° from each other.

This device can be manufactured at a minimum of tooling costs because most parts are but simple stampings with little machining required.

Although the wedge actuator of the present invention is shown and described herein in combination with an actuation lever it is entirely possible to use it without the lever since the input force could be applied directly to the wedge actuator.

The invention provides a simple mechanical brake actuating means that can be directly connected to a hand brake operating lever without the use of intermittent bell crank levers or other force direction changers.

In all forms of the invention the wedge is reciprocated at right angles to the directions of movement of the brake shoes, preferably by means of an actuation lever that fulcrums on a stationary bearing surface. The parts may be arranged in a number of different orientations to suit space and connection requirements.

The present invention may be embodied in other specific forms without departing from the spirit and essential characteristics thereof, the present embodiments are therefore being considered as illustrative and not restrictive, the scope of the invention being indicated by the appended claims rather than by the foregoing description.

What is claimed and desired to be secured by United States Letters Patent is:

1. A brake assembly of the type wherein brake shoes are moved outwardly to engage a rotating drum comprising a support, a pair of oppositely movable brake shoes pivoted on one side of said support at adjacent ends at one side of the assembly, means for resiliently biasing said shoes toward a position where they are retracted with respect to said drum, an actuator for said shoes mounted on said support for substantially reciprocable movement in directions substantially perpendicular to the directions of shoe movement, said actuator comprising a wedge member extending slidably through a guide aperture in said support between the other ends of said shoes, an actuator lever pivoted to said wedge member at the side of said support opposite said brake shoes, means rigid with said support at said opposite side of said support providing a bearing and reaction surface adapted to be engaged by a portion of said actuator lever when the actuator lever is rocked about its pivotal connection to said wedge member, and operator controlled means for rocking said lever.

2. A brake assembly of the type wherein brake shoes are moved outwardly to engage a rotating drum comprising a support, a pair of oppositely movable brake shoes pivoted on one side of said support at adjacent ends at one side of the assembly, means for resiliently biasing said shoes toward a position where they are retracted with respect to said drum, an actuator for said shoes mounted on said support for substantially reciprocable movement in directions substantially perpendicular to the directions of shoe movement, said actuator comprising a flat wedge member extending through an aperture in said support between the other ends of said shoes and having opposite inclined sides engaging the shoe ends, an actuator lever pivoted to said wedge member at the side of said support opposite said brake shoes, the axis of said pivot being perpendicular to the direction of wedge member movement, means rigid with said support at said opposite side of said support providing a bearing and reaction surface adapted to be engaged by a portion of said actuator lever when the actuator lever is rocked about its pivotal connection to said wedge member, and operator controlled means for rocking said lever.

3. A brake assembly of the type wherein brake shoes are moved outwardly to engage a rotating drum comprising a support, a pair of oppositely movable brake shoes pivoted on one side of said support at adjacent ends at one side of the assembly, means for resiliently biasing said shoes toward a position where they are retracted with respect to said drum, an actuator for said shoes mounted on said support for substantially reciprocable movement in direction substantially perpendicular to the directions of shoe movement, said actuator comprising a flat wedge member extending through an aperture in said support between the other ends of said shoes and having opposite inclined edges engaging the shoe ends, an actuator lever pivoted to said wedge member at the side of said support opposite said brake shoes, the axis of said pivot being at an angle with respect to the directions of movement of the wedge member, means rigid with said support at said opposite side of said support providing a bearing and reaction surface adapted to be engaged by a portion of said actuator lever when the actuator lever is rocked about its pivotal connection to said wedge member, and operator controlled means for rocking said lever.

4. In a brake assembly adapted for coaction with a relatively rotatable drum, a support, a pair of brake shoes, anchor means on said support pivotally mounting adjacent ends of said shoes, said support having an aperture adjacent the other ends of said shoes, a flat wedge actuator mounted on said support and slidably guided by said aperture for substantially reciprocable movement substantially perpendicular to the directions of shoe movement, said actuator having opposite inclined sides directly slidably engaging the other ends of said shoes, means for resiliently biasing said shoes to retracted position with respect to said drum, and operator controlled means directly pivotally connected to said actuator.

5. In the brake assembly defined in claim 4, said pivot connection to the actuator being on an axis that is substantially parallel to the plane of the flat wedge actuator.

6. In the brake assembly defined in claim 4, said pivot connection to the actuator being an axis that is disposed at an angle to the plane of the flat wedge actuator.

7. In the brake assembly defined in claim 4, said operator controlled means comprising a lever pivoted intermediate its ends directly to said wedge actuator, with means being provided rigid with the support to serve as a bearing and reaction point for an end of said lever when the lever is rocked about said pivot connection axis.

8. In the brake assembly defined in claim 4, said support aperture being a slot and said wedge actuator extending through said slot with floating clearance.

9. In the brake assembly defined in claim 8, a fixed shoe end engaging abutment on said support disposed adjacent said slot and between said other ends of the shoes.

10. In a brake assembly adapted for coaction with a relatively rotatable drum, a support, a pair of brake shoes, anchor means on said support pivotally mounting adjacent ends of said shoes, said support having an aperture adjacent the other ends of said shoes, a non-floating wedge actuator mounted on said support and slidably guided with a relatively closely confined sliding fit in said aperture for substantially reciprocable movement substantially perpendicular to the directions of shoe movement, said actuator having opposite inclined sides directly slidably engaging the other ends of said shoes, means resiliently biasing said shoes to retracted position with respect to said drum, and operator controlled means directly pivotally connected to said actuator.

References Cited in the file of this patent

UNITED STATES PATENTS

| | | |
|---|---|---|
| 1,875,391 | Parker | Sept. 6, 1932 |
| 2,001,933 | McCann | May 21, 1935 |
| 2,001,936 | Parker | May 21, 1935 |
| 2,022,046 | La Brie | Nov. 26, 1935 |
| 2,562,356 | House | July 31, 1951 |

FOREIGN PATENTS

| | | |
|---|---|---|
| 683,601 | Germany | Nov. 10, 1939 |